(12) United States Patent
Kaminsky et al.

(10) Patent No.: US 10,163,098 B2
(45) Date of Patent: Dec. 25, 2018

(54) USING BOTH SOCIAL MEDIA AND NON-SOCIAL MEDIA INFORMATION TO IDENTIFY ANOMALOUS BEHAVIOR

(71) Applicant: International Business Machines Corporation, Armonk, NY (US)

(72) Inventors: David L. Kaminsky, Chapel Hill, NC (US); Girish Sundaram, Pune (IN)

(73) Assignee: International Business Machines Corporation, Armonk, NY (US)

(*) Notice: Subject to any disclaimer, the term of this patent is extended or adjusted under 35 U.S.C. 154(b) by 939 days.

(21) Appl. No.: 13/765,851

(22) Filed: Feb. 13, 2013

(65) Prior Publication Data
US 2014/0229376 A1    Aug. 14, 2014

(51) Int. Cl.
G06Q 30/00 (2012.01)
G06Q 20/38 (2012.01)
G06Q 50/00 (2012.01)
G06Q 20/12 (2012.01)

(52) U.S. Cl.
CPC ........... G06Q 20/382 (2013.01); G06Q 20/12 (2013.01); G06Q 50/01 (2013.01)

(58) Field of Classification Search
CPC .......................... G06Q 50/01; G06Q 20/4016
USPC .... 705/35–45, 1.1, 14.45, 75; 715/209, 781; 707/723, 700
See application file for complete search history.

(56) References Cited

U.S. PATENT DOCUMENTS

| 8,438,089 B1* | 5/2013 | Wasserblat | G06Q 40/02 704/270 |
| 8,635,117 B1* | 1/2014 | Acuna-Rohter | 705/26.35 |
| 2010/0051684 A1 | 3/2010 | Powers | |
| 2012/0316950 A1* | 12/2012 | LaPorte | G06Q 20/3221 705/14.33 |
| 2013/0041821 A1* | 2/2013 | Kingston et al. | 705/44 |
| 2014/0067656 A1* | 3/2014 | Ganor et al. | 705/39 |

(Continued)

FOREIGN PATENT DOCUMENTS

WO    2012125852 A2    9/2012

OTHER PUBLICATIONS

"IBM Entity Analytics Solutions," http://www-01.ibm.com/software/data/identity-insight-solutions, 2012.

*Primary Examiner* — John H. Holly
(74) *Attorney, Agent, or Firm* — Robert A. Voigt, Jr.; Winstead, P.C.

(57) ABSTRACT

A method, system and computer program product for identifying anomalous behavior (e.g., suspicious transactions). Information from at least one social media source (e.g., a posting) and from at least one non-social media source (e.g., a booking) are monitored. A transaction (e.g., credit card transaction) involving a user is identified. The monitored information is then analyzed to identify one or more characteristics (e.g., location of the user) of the user. A rating of invalidity of the transaction is generated based on the one or more characteristics, where the rating of invalidity refers to the likelihood that the transaction is likely to be anomaly, such as a suspicious transaction. If the rating exceeds a threshold, then an anomaly may be said to have occurred. By identifying anomalous behavior using both social media and non-social media sources, anomalous activities that truly occurred will be more accurately detected.

20 Claims, 3 Drawing Sheets

(56) References Cited

U.S. PATENT DOCUMENTS

2015/0193774 A1\* 7/2015 Wetzel ............... G06Q 20/4016
 705/44
2016/0071105 A1\* 3/2016 Groarke ............ G06Q 20/4016
 705/44

\* cited by examiner

USING BOTH SOCIAL MEDIA AND NON-SOCIAL MEDIA INFORMATION TO IDENTIFY ANOMALOUS BEHAVIOR

TECHNICAL FIELD

The present invention relates generally to behavioral analysis, and more particularly to using both social media and non-social media information to identify anomalous behavior (e.g., suspicious transactions).

BACKGROUND

Currently, companies, such as banks and credit card companies, attempt to recognize "suspicious" events or transactions using behavioral analysis. That is, companies attempt to recognize suspicious events or transactions by analyzing the behavior of the customer based on various criteria. Often, these criteria involve multiple transactions over some period of time, involving the same transaction sender or receiver. For instance, if a customer typically performs credit card transactions in the Boston area and then purchases an item to be shipped to Kenya, such a transaction may be deemed to be "suspicious" since it is an anomaly from prior behavior (e.g., transactions limited to the Boston area). As a result, the credit card company may deny such a transaction and temporarily deactivate the credit card account preventing it from being further used.

However, if the customer was planning a safari trip to Kenya and the transaction was a valid transaction, then the customer may be inconvenienced in having to contact the credit card company informing them that it was a valid transaction as the customer will be traveling to Kenya.

Such information about the customer (e.g., the customer planning a safari trip to Kenya) may have been obtained from social media sources. However, since current behavioral analysis relies solely on non-social media sources, "suspicious" events or transactions may be incorrectly identified or not even identified at all.

BRIEF SUMMARY

In one embodiment of the present invention, a method for identifying anomalous behavior comprises monitoring information from at least one social media source and at least one non-social media source. The method further comprises identifying a transaction involving a user. Additionally, the method comprises analyzing the monitored information to determine one or more characteristics of the user. Furthermore, the method comprises generating a rating of invalidity of the transaction based on the one or more characteristics to determine if the transaction is an anomaly. In addition, the method comprises performing, by a processor, an action to respond to the anomaly in response to the rating exceeding a threshold.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for identifying anomalous behavior (e.g., suspicious transactions). In one embodiment of the present invention, information from at least one social media source (e.g., a posting, a user profile) and from at least one non-social media source (e.g., a booking, a purchase) are monitored. A transaction (e.g., credit card transaction) involving a user is identified. The monitored information is then analyzed to identify one or more characteristics (e.g., location of the user) of the user. For example, the user indicates on the user's profile that he/she is on vacation in Paris. A rating of invalidity of the transaction is generated based on the one or more characteristics, where the rating of invalidity refers to the likelihood that the transaction is likely to be anomaly, such as a suspicious transaction. If the rating exceeds a threshold, then an anomaly may be said to have occurred. By identifying anomalous behavior (e.g., suspicious credit/debit card transaction) using both social media and non-social media sources, anomalous activities that truly occurred will be more accurately detected.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
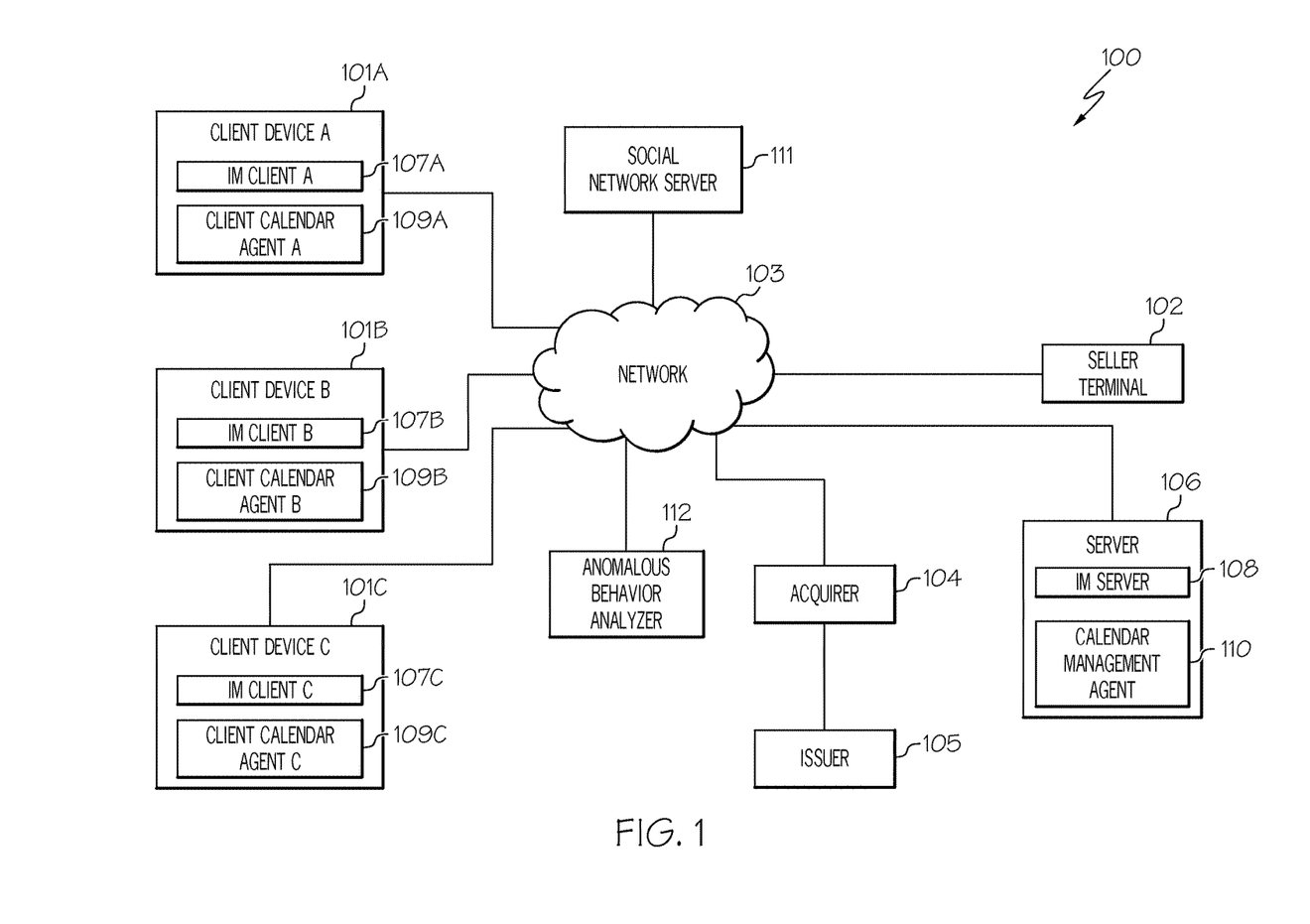
FIG. 1 illustrates a communication system configured in accordance with an embodiment of the present invention.

Referring now to the Figures in detail, FIG. 1 illustrates a communication system 100 for practicing the principles of the present invention in accordance with an embodiment of the present invention. Communication system 100 includes client devices 101A-101C (identified as "Client Device A," "Client Device B," and "Client Device C," respectively, in FIG. 1) connected to a seller terminal 102 via a network 103. Client devices 101A-101C may collectively or individually be referred to as client devices 101 or client device 101, respectively. Client device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to network 103 and consequently communicating with other client devices 101 and seller terminal 102.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

In one embodiment, a user of client device 101 represents a buyer of a product or a service sold by a merchant. Such products or services may be advertised by the merchant via an electronic catalog. In one embodiment, a user of client device 101 purchases the product or service by sending the order to the merchant (represented as seller terminal 102) through network 103 together with the user's credit/debit card number (hereinafter referred to as "card number"). The merchant may provide the card number to an acquirer 104 (e.g., a bank or financial institution that processes credit or debit card payments for products or services for a merchant) that then requests authorization for the order from the issuer 105 of the card number. An authorize code is sent to acquirer 104 by the issuer 105 if there is valid credit available or a valid amount of funds in the cardholder's account with issuer 105.

While the foregoing discusses the transaction occurring between the buyer (user of client device 101) and the seller (user of seller terminal 102) via network 103, the transaction may occur in the seller's place of business. In such a case, the card number is directly provided to the seller by the buyer, such as by swiping the buyer's credit/debit card with a card reader. The card number may then be sent to acquirer 104 as discussed above. The principles of the present invention are to cover such embodiments in connection with identifying anomalous behavior (e.g., suspicious credit/debit card transaction) using both social media and non-social media information as discussed herein.

In communication system 100, client device 101 may further be connected to a server 106 via network 103. Client device 101 may be configured to send and receive text-based messages in real-time during an instant messaging session. Any user of client device 101 may be the creator or initiator of an instant message (message in instant messaging) and any user of client device 101 may be a recipient of an instant message. Furthermore, client device 101 may be configured to send out calendar appointments or meeting notices/invitations to other client devices 101 using a calendar application via network 103. Any user of client device 101 may be the creator or initiator of a meeting invitation and any user of client device 101 may be a recipient of a meeting invitation.

Furthermore, in communication system 100, client devices 101A-101C include a software agent, referred to herein as an Instant Messaging (IM) client 107A-107C, respectively. Instant messaging clients 107A-107C may collectively or individually be referred to as instant messaging clients 107 or instant messaging client 107, respectively. Furthermore, sever 106 includes a software agent, referred to herein as the Instant Messaging (IM) server 108. IM client 107 provides the functionality to send and receive instant messages. As messages are received, IM client 107 presents the messages to the user in a dialog window (or IM window).

Furthermore, IM client 107 provides the functionality for client device 101 to connect to the IM server 108 which provides the functionality of distributing the instant messages to the IM clients 107 associated with each of the sharing users.

Client devices 101A-101C may further include a software agent, referred to herein as a client calendar agent 109A-109C, respectively. Client calendar agents 109A-109C may collectively or individually be referred to as client calendar agents 109 or client calendar agent 109, respectively. Furthermore, sever 106 may include a software agent, referred to herein as the calendar management agent 110. Calendar management agent 110 interfaces with client calendar agent 109 to present meeting invitations to client devices 101. Client calendar agent 109 is configured to display the received meeting invitation as well as display calendar schedule information on the client device's 101 calendar user interface.

While the preceding discusses each client device 101 as including an IM client 107 and a client calendar agent 109, some client devices 101 may only include a subset of these software agents. Furthermore, while the preceding discusses a single server 106 including the software agents, such as IM server 108 and calendar management agent 110, multiple servers may be used to implement these services. Furthermore, each server 106 may not necessarily be configured to include all of these software agents, but only a subset of these software agents.

System 100 further includes a social network server 111, which may be a web server configured to offer a social networking and/or microblogging service, enabling users of client devices 101 to send and read other users' posts. "Posts," as used herein, include any one or more of the following: text (e.g., comments, sub-comments and replies), audio, pictures (with or without captions), video images, etc. Social network server 111 is connected to network 103 by wire or wirelessly. While FIG. 1 illustrates a single social network server 111, it is noted for clarity that multiple servers may be used to implement the social networking and/or microblogging service.

System 100 further includes an anomalous behavior analyzer 112 connected to network 103 by wire or wirelessly. Anomalous behavior analyzer 112 is configured to analyze the behavior of a user of client 101 using both social media information (e.g., a posting, an instant message) and non-social media information (e.g., a booking) to identify anomalous behavior (e.g., suspicious transaction involving the use of a credit/debit card number) as discussed in further detail below. A description of the hardware configuration of anomalous behavior analyzer 112 is provided below in connection with FIG. 2.

System 100 is not to be limited in scope to any one particular network architecture. System 100 may include any number of client devices 101, seller terminals 102, networks 103, acquirers 104, issuers 105, servers 106, social network servers 111 and anomalous behavior analyzers 112.

Figure 2:
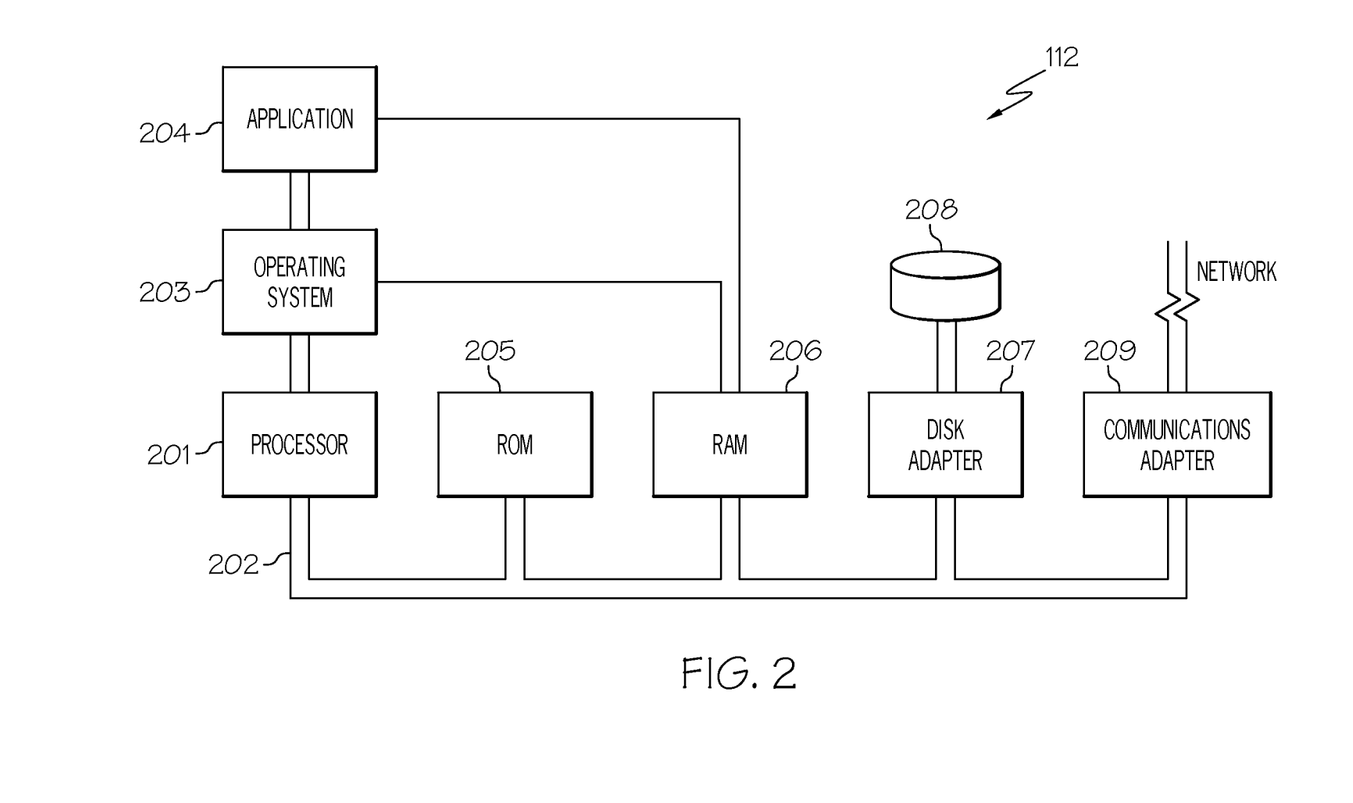
FIG. 2 illustrates a hardware configuration of an anomalous behavior analyzer in accordance with an embodiment of the present invention.

Referring now to FIG. 2, FIG. 2 illustrates a hardware configuration of anomalous behavior analyzer 112 (FIG. 1) which is representative of a hardware environment for practicing the present invention. Referring to FIG. 2, anomalous behavior analyzer 112 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for identifying anomalous behavior (e.g., suspicious credit/debit card transaction) using both social media and non-social media information as discussed further below in association with FIG. 3.

Referring again to FIG. 2, read-only memory ("ROM") 205 is coupled to system bus 202 and includes a basic input/output system ("BIOS") that controls certain basic functions of anomalous behavior analyzer 112. Random access memory ("RAM") 206 and disk adapter 207 are also coupled to system bus 202. It should be noted that software components including operating system 203 and application 204 may be loaded into RAM 206, which may be anomalous behavior analyzer's 112 main memory for execution. Disk adapter 207 may be an integrated drive electronics ("IDE") adapter that communicates with a disk unit 208, e.g., disk drive. It is noted that the program for identifying anomalous behavior (e.g., suspicious credit/debit card transaction) using both social media and non-social media information, as discussed further below in association with FIG. 3, may reside in disk unit 208 or in application 204.

Anomalous behavior analyzer 112 may further include a communications adapter 209 coupled to bus 202. Communications adapter 209 interconnects bus 202 with an outside network (network 103 of FIG. 1) thereby enabling anomalous behavior analyzer 112 to communicate with client devices 101, seller terminal 102, server 106 and social network server 106 of FIG. 1.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, currently, companies, such as banks and credit card companies, attempt to recognize "suspicious" events or transactions using behavioral analysis. That is, companies attempt to recognize suspicious events or transactions by analyzing the behavior of the customer based on various criteria. Often, these criteria involve multiple transactions over some period of time, involving the same transaction sender or receiver. For instance, if a customer typically performs credit card transactions in the Boston area and then purchases an item to be shipped to Kenya, such a transaction may be deemed to be "suspicious" since it is an anomaly from prior behavior (e.g., transactions limited to the Boston area). As a result, the credit card company may deny such a transaction and temporarily deactivate the credit card account preventing it from being further used. However, if the customer was planning a safari trip to Kenya and the transaction was a valid transaction, then the customer may be inconvenienced in having to contact the credit card company informing them that it was a valid transaction as the customer will be traveling to Kenya. Such information about the customer (e.g., the customer planning a safari trip to Kenya) may have been obtained from social media sources. However, since current behavioral analysis relies solely on non-social media sources, "suspicious" events or transactions may be incorrectly identified or not even identified at all.

The principles of the present invention provide a means for identifying anomalous behavior (e.g., suspicious credit/debit card transaction) using both social media and non-social media sources thereby more accurately determining if an anomaly truly occurred as discussed below in connection with FIG. 3.

Figure 3:
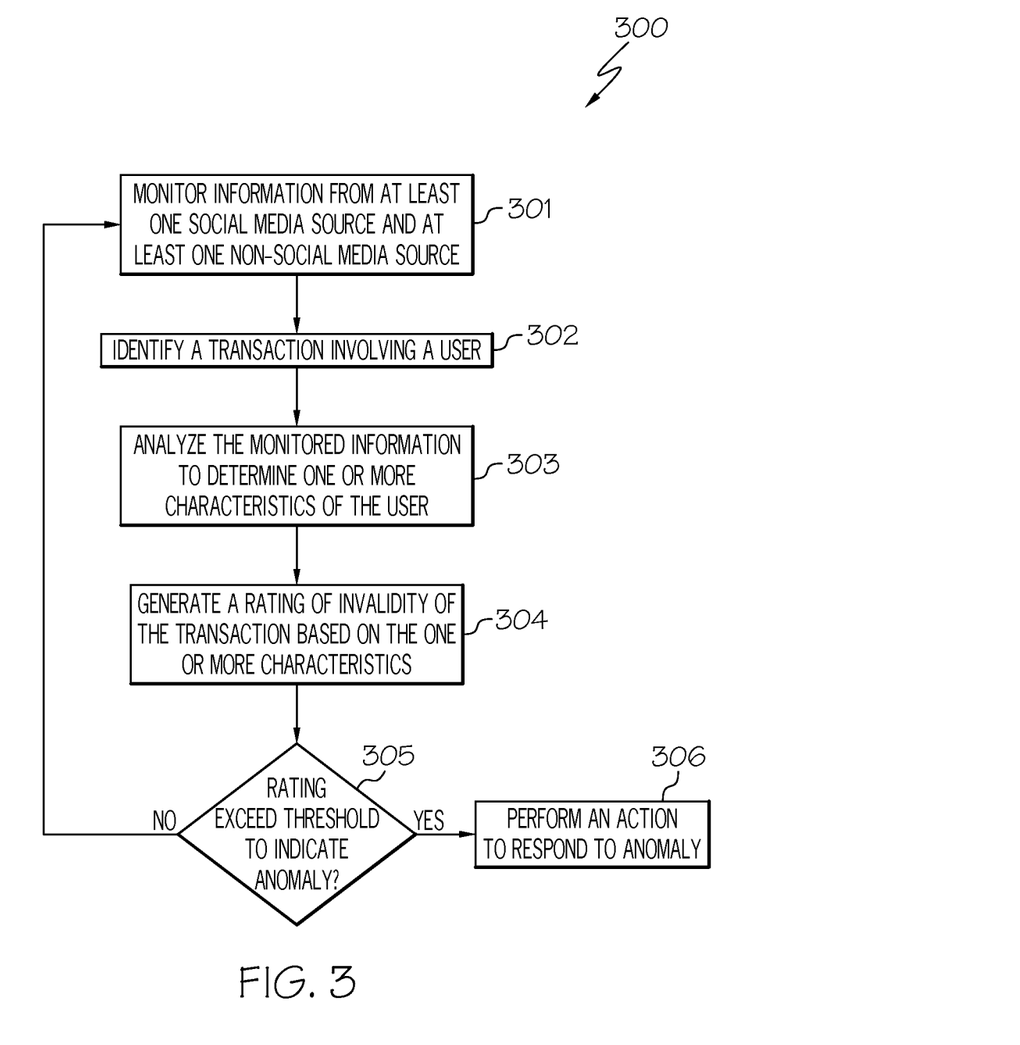
FIG. 3 is a flowchart of a method for identifying anomalous behavior using social media sources and non-social media sources in accordance with an embodiment of the present invention.

FIG. 3 is a flowchart of a method 300 for identifying anomalous behavior using social media sources and non-social media sources in accordance with an embodiment of the present invention.

Referring to FIG. 3, in conjunction with FIGS. 1-2, in step 301, anomalous behavior analyzer 112 monitors information from at least one social media source (e.g., postings, instant messages, repostings, a profile, such as a profile on Facebook®, calendar entries) and at least one non-social media source (e.g., a booking, a login, a purchase, such as a credit/debit card transaction, a communication).

In step 302, anomalous behavior analyzer 112 identifies a transaction (e.g., credit/debit card transaction) involving a user (user of client device 101). In one embodiment, the transaction is identified from the monitored information, such as from social media data. In another embodiment, anomalous behavior analyzer 112 receives an indication of the transaction, such as from a bank or credit card company.

In step 303, anomalous behavior analyzer 112 analyzes the monitored information to identify one or more characteristics of the user. For example, the monitored information may identify the location of the user conducting the transaction identified in step 302. For example, a social media source, such as the user's profile, may indicate that the user is currently at a particular location. In another example, a non-social media source, such as an Internet Protocol (IP) address for a remote login attempt by the user to seller terminal 102 or server 106, may be used to determine a location of the user. In one embodiment, the information from both the social media sources and the non-social media sources are analyzed in combination using standard matching techniques. In this manner, a connection between information obtained from non-social media sources and information obtained from social media sources can be obtained. For example, a purchase in the city of Paris by the user, an indication of being on vacation in Paris on the user's profile page or a login attempt by the user from Paris may all be identified as being related using standard matching techniques (e.g., each of these activities involves the city of Paris).

In step 304, anomalous behavior analyzer 112 generates a rating of invalidity of the transaction based on the characteristics determined in step 303. A rating of invalidity refers to the likelihood that the transaction is likely to be anomaly, such as a suspicious transaction. For example, if an alleged purchase by the user is detected in the city of Paris, but the user has indicated that he/she is on vacation in Japan on the user's profile page, then the purchase transaction may have a higher rating of invalidity than if the user had indicated that he/she is on vacation in Paris on the user's profile page. In another example, if an alleged purchase by the user is detected in Kenya in November, but the user had posted that he/she was on vacation in Kenya in early October and returning back home at the end of October, then such a purchase transaction may have a higher rating of invalidity than if the user had indicated that he/she was on vacation in Kenya in November. By using both social media and non-social media sources, the rating of invalidity will more accurately reflect the true likelihood that the transaction is likely to be an anomaly. In one embodiment, an artificial intelligent system is used for analyzing the monitored information to help deduce appropriate conclusions concerning the rating of invalidity (i.e., generate an appropriate rating of invalidity).

In step 305, a determination is made by anomalous behavior analyzer 112 as to whether the rating exceeds a threshold to indicate that an anomaly (e.g., suspicious transaction) may have occurred.

If the rating does not exceed the threshold, then anomalous behavior analyzer 112 continues to monitor information from at least one social media source and at least one non-social media source in step 301.

If, however, the rating exceeds the threshold, then, in step 306, anomalous behavior analyzer 112 performs an action to respond to the anomaly. For example, anomalous behavior analyzer 112 may generate an alert, a notification and/or a denial (e.g., deny the transaction, deny the login attempt, deny the purchase). Furthermore, in one embodiment, there may be a plurality of thresholds that are evaluated against the rating, where each threshold may indicate the degree of anomalous behavior that is detected. For example, if the rating exceeds a threshold that indicates a small possibility of anomalous behavior, then anomalous behavior analyzer 112 may perform an action commensurate with the small possibility of anomalous behavior, such as requiring merchants to see a photo identification of the user or monitoring the information from the social media and non-social media sources more closely in step 301.

In some implementations, method 300 may include other and/or additional steps that, for clarity, are not depicted. Further, in some implementations, method 300 may be executed in a different order presented and that the order presented in the discussion of FIG. 3 is illustrative. Additionally, in some implementations, certain steps in method 300 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for improving the technology in behavior analysis systems by identifying suspicious transactions using both social and non-social media sources, the method comprising:
   monitoring information from at least one social media source and at least one non-social media source;
   identifying a transaction between a user of a client device and a merchant, wherein said transaction is identified from said monitored information, a bank or a credit card company;
   analyzing said monitored information from said at least one social media source and said at least one non-social media source in combination using standard matching techniques by an artificial intelligent system to identify one or more characteristics of said user in order to more accurately detect anomalous activities;
   generating a rating of invalidity of said transaction by said artificial intelligent system based on said identified one or more characteristics of said user, wherein said rating of invalidity corresponds to a likelihood that said transaction is an anomaly;
   determining said transaction to be said anomaly in response to said rating of invalidity of said transaction exceeding a threshold; and
   performing, by a processor, an action to respond to said anomaly, wherein said action comprises one or more of the following: an alert, a denial and a notification.

2. The method as recited in claim 1, wherein said information from said at least one social media source and said at least one non-social media source comprises one or more of the following: a communication, a purchase, a calendar entry, a booking, a login, an instant message, a posting, a reposting and a profile.

3. The method as recited in claim 1, wherein said one or more characteristics of said user comprise a location of said user, wherein said location of said user is identified based on an Internet Protocol address for a remote login attempt.

4. The method as recited in claim 1, wherein said one or more characteristics of said user comprise a location of said user, wherein said location of said user is obtained from said at least one social media source.

5. The method as recited in claim 1 further comprising:
   comparing said rating of invalidity against a plurality of thresholds, wherein each of said plurality of thresholds indicates a degree of anomalous behavior that is detected; and
   performing an action commensurate with said degree of anomalous behavior detected.

6. The method as recited in claim 1, wherein said denial comprises a denial of said transaction, a denial of a login attempt or a denial of a purchase.

7. The method as recited in claim 1, wherein said transaction comprises a credit/debit card transaction.

8. A computer program product embodied in a computer readable storage medium for identifying suspicious transactions using both social and non-social media sources, the computer program product comprising the programming instructions for:
   monitoring information from at least one social media source and at least one non-social media source;
   identifying a transaction between a user of a client device and a merchant, wherein said transaction is identified from said monitored information, a bank or a credit card company;
   analyzing said monitored information from said at least one social media source and said at least one non-social media source in combination using standard matching techniques by an artificial intelligent system to identify one or more characteristics of said user in order to more accurately detect anomalous activities;
   generating a rating of invalidity of said transaction by said artificial intelligent system based on said identified one or more characteristics of said user, wherein said rating of invalidity corresponds to a likelihood that said transaction is an anomaly;
   determining said transaction to be said anomaly in response to said rating of invalidity of said transaction exceeding a threshold; and
   performing an action to respond to said anomaly, wherein said action comprises one or more of the following: an alert, a denial and a notification.

9. The computer program product as recited in claim 8, wherein said information from said at least one social media source and said at least one non-social media source comprises one or more of the following: a communication, a purchase, a calendar entry, a booking, a login, an instant message, a posting, a reposting and a profile.

10. The computer program product as recited in claim 8, wherein said one or more characteristics of said user comprise a location of said user, wherein said location of said user is identified based on an Internet Protocol address for a remote login attempt.

11. The computer program product as recited in claim 8, wherein said one or more characteristics of said user comprise a location of said user, wherein said location of said user is obtained from said at least one social media source.

12. The computer program product as recited in claim 8, wherein the program code further comprises the programming instructions for:
   comparing said rating of invalidity against a plurality of thresholds, wherein each of said plurality of thresholds indicates a degree of anomalous behavior that is detected; and
   performing an action commensurate with said degree of anomalous behavior detected.

13. The computer program product as recited in claim 8, wherein said denial comprises a denial of said transaction, a denial of a login attempt or a denial of a purchase.

14. The computer program product as recited in claim 8, wherein said transaction comprises a credit/debit card transaction.

15. A system, comprising:
   a memory unit for storing a computer program for identifying suspicious transactions using both social and non-social media sources; and
   a processor coupled to said memory unit, wherein said processor is configured to execute the program instructions of the computer program comprising:
      monitoring information from at least one social media source and at least one non-social media source;
      identifying a transaction between a user of a client device and a merchant, wherein said transaction is identified from said monitored information, a bank or a credit card company;
      analyzing said monitored information from said at least one social media source and said at least one non-social media source in combination using standard matching techniques by an artificial intelligent system to identify one or more characteristics of said user in order to more accurately detect anomalous activities;
      generating a rating of invalidity of said transaction by said artificial intelligent system based on said identified one or more characteristics of said user, wherein said rating of invalidity corresponds to a likelihood that said transaction is an anomaly;

determining said transaction to be said anomaly in response to said rating of invalidity of said transaction exceeding a threshold; and performing an action to respond to said anomaly, wherein said action comprises one or more of the following: an alert, a denial and a notification.

16. The system as recited in claim 15, wherein said information from said at least one social media source and said at least one non-social media source comprises one or more of the following: a communication, a purchase, a calendar entry, a booking, a login, an instant message, a posting, a reposting and a profile.

17. The system as recited in claim 15, wherein said one or more characteristics of said user comprise a location of said user, wherein said location of said user is identified based on an Internet Protocol address for a remote login attempt.

18. The system as recited in claim 15, wherein said one or more characteristics of said user comprise a location of said user, wherein said location of said user is obtained from said at least one social media source.

19. The system as recited in claim 15, wherein the program instructions of the computer program further comprise:

comparing said rating of invalidity against a plurality of thresholds, wherein each of said plurality of thresholds indicates a degree of anomalous behavior that is detected; and performing an action commensurate with said degree of anomalous behavior detected.

20. The system as recited in claim 15, wherein said denial comprises a denial of said transaction, a denial of a login attempt or a denial of a purchase.

\* \* \* \* \*